United States Patent
Dwersteg et al.

(10) Patent No.: US 8,564,230 B2
(45) Date of Patent: Oct. 22, 2013

(54) METHOD AND CIRCUIT ARRANGEMENT FOR SENSORLESS ENGINE LOAD DETECTION AND FOR CONTROLLING THE MOTOR CURRENT IN ACCORDANCE WITH THE LOAD VALUE IN STEPPER MOTORS

(75) Inventors: Bernhard Dwersteg, Hamburg (DE); Lars Larsson, Hamburg (DE)

(73) Assignee: Trinamic Motion Control GmbH & Co. KG, Hamburg (DE)

( * ) Notice: Subject to any disclaimer, the term of this patent is extended or adjusted under 35 U.S.C. 154(b) by 5 days.

(21) Appl. No.: 13/392,825

(22) PCT Filed: Sep. 6, 2010

(86) PCT No.: PCT/DE2010/075085
§ 371 (c)(1),
(2), (4) Date: Feb. 27, 2012

(87) PCT Pub. No.: WO2011/026489
PCT Pub. Date: Mar. 10, 2011

(65) Prior Publication Data
US 2012/0153886 A1   Jun. 21, 2012

(30) Foreign Application Priority Data
Sep. 5, 2009 (DE) .................. 10 2009 040 139

(51) Int. Cl.
*H02P 6/12* (2006.01)
(52) U.S. Cl.
USPC ...................... 318/400.15; 318/696
(58) Field of Classification Search
USPC ............... 318/430, 431, 432, 434, 685, 696, 318/400.15
See application file for complete search history.

(56) References Cited

U.S. PATENT DOCUMENTS

| 4,520,302 | A | * | 5/1985 | Hill et al. .................. 318/696 |
| 4,739,346 | A |   | 4/1988 | Buckley |
| 5,677,607 | A |   | 10/1997 | Sugiyama et al. |
| 5,838,132 | A |   | 11/1998 | Tanaka |

(Continued)

FOREIGN PATENT DOCUMENTS

| DE | 4141081 A1 | 7/1993 |
| DE | 10006648 A1 | 8/2000 |

(Continued)

OTHER PUBLICATIONS

Rummich, Erich (Hrsg.): Elektrische Schrittmotoren und -antrieb; expert—Verlag 1995: S. 17-18.

(Continued)

*Primary Examiner* — Eduardo Colon Santana
*Assistant Examiner* — Iftekhar Mustafa
(74) *Attorney, Agent, or Firm* — WRB-IP LLP

(57) ABSTRACT

A method and a circuit arrangement are provided which enable a mechanical load applied to the motor shaft of a stepper motor (M) or a load angle of the stepper motor to be detected in a sensorless manner. A method and circuit arrangement are also provided which enable the motor current(s) of a stepper motor to be controlled in accordance with the load value such that the load angle is as high as possible without risking step losses, in order to maintain the current consumption of the motor as low as possible. This is achieved according by evaluating the temporal duration of the ON- and the FD-phases during the chopper control of the motor.

11 Claims, 3 Drawing Sheets

(56) References Cited

U.S. PATENT DOCUMENTS

| | | |
|---|---|---|
| 6,838,853 B2 | 1/2005 | Matsunaga et al. |
| 2004/0000884 A1 | 1/2004 | Inao et al. |
| 2005/0134211 A1 | 6/2005 | Fukamizu et al. |
| 2007/0118308 A1* | 5/2007 | El-Ibiary .................. 702/60 |
| 2008/0197794 A1 | 8/2008 | Vermeir et al. |
| 2009/0206788 A1 | 8/2009 | Ando |

FOREIGN PATENT DOCUMENTS

| | | |
|---|---|---|
| DE | 203 05 771 U1 | 8/2003 |
| DE | 10 2005 050 618 A1 | 4/2006 |
| DE | 10 2008 026 869 A1 | 12/2009 |
| EP | 0087172 A1 | 9/1983 |
| EP | 0119097 A1 | 9/1984 |
| JP | 63234897 A | 9/1988 |
| JP | 2002-281788 | 9/2002 |
| WO | 2003030349 A1 | 4/2003 |

OTHER PUBLICATIONS

German Search Report from corresponding German Application No. 10 2009 040 139.3.

International Search Report (Jun. 1, 2010) for corresponding International Application PCT/DE2010/075085.

Report International Preliminary Report on Patentability (with translation) (Aug. 16, 2012) for corresponding International Application PCT/DE2010/075085.

* cited by examiner

METHOD AND CIRCUIT ARRANGEMENT FOR SENSORLESS ENGINE LOAD DETECTION AND FOR CONTROLLING THE MOTOR CURRENT IN ACCORDANCE WITH THE LOAD VALUE IN STEPPER MOTORS

BACKGROUND AND SUMMARY

The invention relates to a method and a circuit arrangement which enable a mechanical load applied to the motor shaft of a stepper motor or a load angle of said stepper motor to be detected in a sensor-free manner. The invention further relates to a method and circuit arrangement which enable the motor current of a stepper motor to be controlled in accordance with the load value or load angle such that the current consumption of the motor is as low as possible.

Stepper motors usually are controlled and energized independent of a current, actual motor load, i.e. a required torque, so that they generate sufficient torque for the highest motor load which is expected when a certain application occurs. Consequently, only two types of load scenarios are distinguished for such applications, i.e. motor standstill and motor operation.

Since the torque and the holding torque of a stepper motor for the most part are proportional to the RMS (root mean square) value of the motor current, multiplied by the sine of the load angle, the motor, in most situations, is operated with motor current that is much too high in relation to the current actual motor load, i.e. is operated at a torque reserve that is much too high. If, for example, the motor is operated with a mean torque reserve of 100%, i.e. with a motor current that is twice as high as required, the result, given that the power loss of the motor is proportional to the square of the motor current, is a static power loss that is increased by a factor of four. Since the mechanical power taken in stepper motors often is small compared to the static power loss, energy losses ranging from 100 to 300% are to be expected, which actually is unnecessary. While a reduction of these losses would be possible by using rotary sensors (position sensors, rotary pulse generators) and analyzing the rotational positions of the rotor, this concept is rejected for the plurality of cost-intensive stepper motor applications in which the stepper motor is used as a purely forward propelled drive and in which angle of rotation sensors thus are not required.

It is desirable to look for a possibility to lower the current consumption of a stepper motor by supplying it, based on a current actually applied motor load, with just enough current that is needed to provide the required torque.

It is desirable to provide a method and a circuit arrangement which enable a mechanical load that is actually applied to the motor shaft of a stepper motor or a load angle of said motor to be detected in a sensor-free manner.

It is desirable to provide a method and a circuit arrangement which enable the operation of a stepper motor based on a current, actual mechanical load applied to the stepper motor or a load angle of said motor such that the current consumption of the motor is as low as possible.

According to aspects of the invention, a method and a circuit arrangement are provided.

A special advantage of solutions according to aspects of the present invention is that they can be realized in a relative easy manner as a component of a known stepper motor control circuit without requiring any changes to the mechanical design of the motor or without requiring any additional mechanical components such as rotary sensors, for example.

The sub-claims contain advantageous further developments of the invention.

BRIEF DESCRIPTION OF THE DRAWINGS

Additional details, characteristics and advantages of the invention can be found in the following description of preferred, exemplary embodiments based on the drawing. The following is shown.

DETAILED DESCRIPTION

Figure 1A:
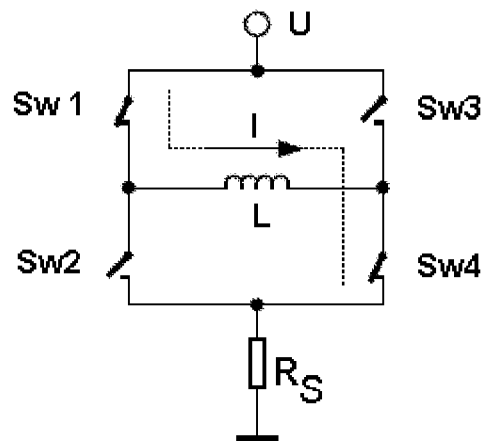
FIG. 1 shows wiring diagrams with different coil current phases in a motor coil during chopper operation.

First, the basic sequences of the method according to the invention are described, said sequences not being limited to the described embodiments. This shall be based on the fact that the load angle of a motor, i.e. the angle between the rotor of the motor and the main direction of the magnetic field that is generated by the coils, also increases with increasing (mechanical) motor load.

In this process the direction of the rotor is defined by its magnetization. If there is no mechanical load, the angle of the rotor corresponds to the main direction of the magnetic field that is generated by the coils—this corresponds to a load angle of 0°. If the direction of the magnetization of the rotor in a two pole motor is orthogonal to the main direction of the magnetic field that is generated by the coils, then this corresponds to a load angle of 90°. This means that in a two pole motor the load angle, when the motor is at a standstill, corresponds directly to the mechanical deflection by the neutral position on the motor shaft caused directly prior to the torque (without load and with a load angle of 0°). In higher pole motors the load angle is an integral multiple of this mechanical deflection by the neutral position. In high pole-count motors the determination of the load angle therefore would require very high resolution rotary pulse generators and very precise current measurements.

The determination of the mechanical motor load according to the invention that is represented by the load angle is based on the voltage that is counter-induced in the motor coils by the rotation of the rotor (counter-electromotive force, CEMF) and especially on the amount of this CEMF, which is position controlled by means of the known chopper control in order to achieve a specified current flow in the respective motor coil, in particular when the amount of the coil current is decreasing, i.e. in case of a sine-shaped specified current during the second and fourth quadrants.

The fast decay phase of the chopper control of the motor is used to remove the energy that is produced by the CEMF and is stored in the coil inductivity. It is known that the chopper control is used to generate for each motor coil, from a provided motor supply voltage, the current direction, current amount and current shape (in micro-step operation usually a sine or cosine shape) to be memorized in the coil according to the specified current in order to drive the rotor.

Such chopper controls or methods are generally known whereby three different coil current phases are distinguished that are timed so that the current through the motor coils follows a specified current as closely as possible (i.e. a sine or cosine shape, for example) and is not changed by the CEMF, if possible.

During the ON phase, the coil current is actively driven in a coil in the direction of the currently specified polarity or the direction of the coil current so that the coil current amount increases relatively quickly and continuously (start up period). This means the coil current direction that is memorized by way of an ON phase corresponds to the current polarity and, respectively, to the direction of the coil current.

In case of a sine-shaped coil current the polarity of the coil current is positive in the first and second quadrants and negative in the third and fourth quadrants, for example.

In the fast decay (FD) phase, the coil current is actively reduced again against the just specified polarity of the coil current by reversing the polarity of the coil and feeding the coil current back into the current supply. The FD phase is used to reduce the coil current relatively quickly, especially in the phases of decreasing coil current amount (i.e. during the second and fourth quadrant of a sine-shaped coil current) and to prevent an adulteration of the current setting, in particular due to the CEMF.

The third phase of the chopper operation is the recirculation phase or slow decay (SD) phase, in which the coil is not controlled actively but rather is short circuited or bridged so that the coil current only decreases gradually (i.e. slower than during the FD phase) due to the internal resistance of the coil and the CEMF.

This means the chopper method activates, measures and combines the temporal duration of these three coil current phases so that the actual coil current follows a specified current (coil set-point current) as contemporaneously and exactly as possible across its entire (e.g. sine-shaped) course, i.e. during the increasing and decreasing current phases, and in particular is not changed (much) by the counter induced voltage (CEMF) caused by the rotor in the motor coils.

Figure 1B:
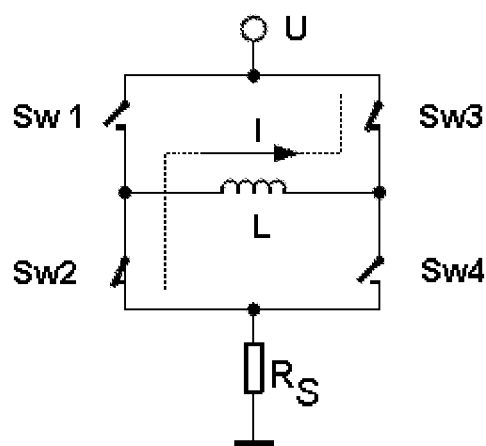
Figure 1C:
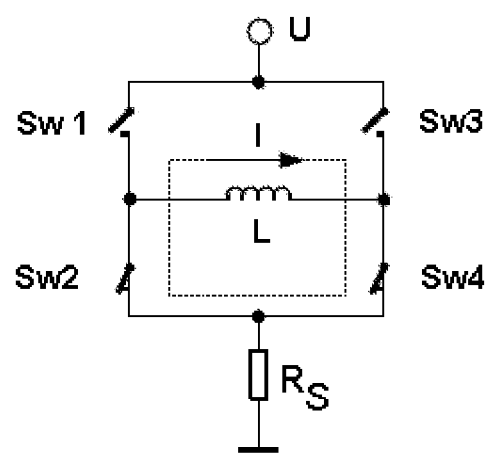

These three coil current phases are indicated schematically in FIG. 1(A), FIG. 1(B) and, respectively, FIG. 1(C). These three figures each show a bridge circuit of a first through fourth switch Sw1, Sw2, Sw3, Sw4, whereby a first and a second switch S21, Sw2 as well as a third and fourth switch Sw3, Sw4 are connected in series and the two series connections are connected in parallel. The coil L is connected to the centers of the bridge branches. The foot of the bridge circuit typically is connected to ground via a measuring resistance RSENSE, while the head of the bridge circuit is connected to a voltage or power supply U of the driver circuit.

FIG. 1(A) shows the switch positions and the resulting direction of the current flow I through the coil L in the direction of the specification during the above mentioned first or ON phase, in which this direction is the same one as the specified direction or polarity of the coil current, whereby the first and the fourth switches Sw1, Sw4 are closed and the second and third switches Sw2, Sw3 are open.

FIG. 1(B) shows the switch positions and the resulting reversal of the polarity of the coil L as well as the return feed of the coil current I into the voltage supply U, i.e. against the specified direction or polarity of the coil current (which is the same one here as in FIG. 1(A)) during the above mentioned second or fast decay phase in which the first and the fourth switch Sw1, Sw4 are open and the second and third switch Sw2, Sw3 are closed.

Finally FIG. 1(C) shows the third or slow decay phase in which the coil L is short circuited or bridged, i.e. the second and the fourth switch Sw2, Sw4 are closed while the first and the third switch Sw1, Sw3 are open (or correspondingly reverse) so that the current I that flows in the coil L gradually decreases in accordance with the internal resistance of the coil L, i.e. recirculates.

For reasons of convenience, a sine-shaped current control of the coils is assumed for the following considerations, i.e. in a 2 phase stepper motor one of the coils is energized with a sine-shaped current and the other coil is energized with a cosine-shaped current. However, these considerations apply accordingly for non-sine-shaped control and/or multiple phase stepper motors.

For the following considerations a distinction is made between phases of decreasing current amount (i.e. during the second and fourth quadrant of the sine-shaped coil current) and phases of increasing current amount (i.e. during the first and third quadrant of the sine-shaped coil current) in the coils L. Each of these current quadrants is resolved by the chopper method into a suitable number of ON, FD and, if any, SD phases, which are determined by the chopper frequency (i.e. the frequency with which the ON-FS-SD cycle according to FIG. 1 is repeated) so that the actual coil current, scanned by the number of these ON, FD and, if any, SD phases follows the sine-shaped specified current (coil set-point current) as closely as possible.

When a motor is operated at a low load angle, for example is idling, a relatively high amount of the energy from the motor is fed back during a decreasing amount of the coil current I(t), said energy having been fed into the motor during the preceding phase of increasing current amount. In this case, during the phase of decreasing current amount, either an overall only relatively small share of ON phases is required, which essentially is used to compensate ohmic losses in the coil, or even, depending on the operating state of the motor, no ON phase at all is required. In principle, when the motor is idling, the entire energy that must be provided for realizing the specified current in the coil (i.e. the target current in the coil) is fed back into the current supply (provided the energy did not decrease due to the ohmic internal resistance of the motor coils or was consumed by the eddy current losses or mechanical friction) and is decreased during the FD phases, which in this case must be relatively long compared to the ON phases.

If, however, the load angle increases or becomes relatively large and reaches approximately 90°, for example, i.e. the load applied to the motor reaches the range of the maximum torque of the motor, the same still applies, during a decreasing amount of coil current I(t), for the ON phases as described above for the case of small load angles. However, during the FD phases increasingly less energy and finally essentially only the energy stored in the coil inductivity is fed back from the motor coils with increasing load angle, i.e. increasing load (i.e. essentially the energy that was fed in during the relatively short ON phases), less the energy with which the ohmic losses on the internal resistance of the motor coils etc. are compensated. The temporal duration tFD of the FD phases consequently becomes increasingly shorter when the load angle approaches 90° and approaches the (short) temporal duration of tON of the ON phases.

This means the load angle of a motor can be determined during a decreasing amount of the coil current I(t) based on the difference between the energy fed into the motor during the ON phases ($=tON*U*I(t)$) and the energy fed back during the FD phases ($=tFD*(-U)*I(t)$). The supply voltage U is constant during this process while the current I(t) is the coil current and follows the specified coil current (i.e. is sine-shaped or cosine-shaped, for example). Times tON and tFD are suitably set based on coil current measurements in the customary manner using the chopper control (PWM control) so that these times are available or known for the evaluation according to the invention.

At the point at which the ON and the FD phases are equally long during a decreasing amount of the coil current I(t) and thus the energy fed into the motor (tON*U*I(t)) equals the energy that is fed back (tFD*(−U)*I(t)), the load angle is in the range of 90° and the motor essentially is operated at maximum torque.

In this case the difference between these two energies E=tON*U*I(t)−tFD*U*I(t) equals zero. U and I(t) are assumed to be about the same in both energy terms since the ON and FD phases are directly consecutive (depending on the programming of the chopper algorithm, there could be a short, generally temporally constant SD phase between the two, however, this phase is not determined by the motor load and does not influence the energy difference E significantly).

If, conversely, the FD phases must become increasingly longer during a decreasing amount of the coil current I(t) due a low load (and thus a smaller load angle) that is applied to the motor so as to be able to decrease the energy that is fed back, the above difference E becomes negative.

With regard to difference E, a slight compensation for the ohmic losses on the internal resistance of the motor coils and other losses, if any, (ref. above) preferably is carried out in order to be able to detect a load angle of 90° exactly. This is done using a preferably adjustable, motor dependent offset value (correction value) K with which the deviation of the real motor from an ideal, i.e. loss-free motor, is compensated. In this case a deviation of the above mentioned difference E from zero indicates a deviation of the load angle from 90°. So conversely the amount of the motor current I(t) can be controlled in relation to the load that is applied to the motor (and thus difference E) so that the load angle that is determined as described above always equals exactly or approximately 90° and preferably is a little below 90° in order to safely avoid step losses.

For the purpose of controlling the motor current, the above mentioned difference E preferably is integrated through the phase of the decreasing amount of the coil current I(t), i.e. a load sum Ls is calculated as the product of supply voltage U and the temporal integral of the current amount that decreases through [the duration of] the phase of (tON*I(t)+K−tFD*I(t)) dt. With a load angle of 90° this load sum Ls then is zero, while the load sum is Ls maximum with a load angle of 0°, i.e. when the motor is idle.

It was found that stepper motors do not produce even CEMF in some cases due to the anisotropy of the magnetic poles or their position in relation to one another in the range of an electric period, but rather that the CEMF can fluctuate in the range of several percentage points within an electric period. This fluctuation then also is reflected in the load sums that are determined through [the duration of] the phases of decreasing current amount. This is why preferably an average of a plurality of load sums Ls each of which is determined during a phase of a decreasing amount of coil current is calculated, said average making it possible to significantly improve the above described determination of the motor load or load angle.

After determining the load angle in the form of the above mentioned difference E and, respectively, the load sum LS, it now is possible to control the motor current so that the difference E and, respectively, the load sum Ls and thus the load angle remain within a certain range, i.e. the motor coil current is controlled such that on one hand it is sufficiently high to generate the motor torque that is required to turn the (mechanical) motor load that currently is applied to the motor shaft and on the other hand is not significantly higher [than what is required]. In other words, the motor current is controlled so that the load angle of the motor is as high as possible, i.e. in the range of 90°, preferably insignificantly below 90°, to avoid the risk of step losses. In this manner the power loss of the motor can be lowered considerably compared to the known operation at constant maximum current while at the same time not increasing the risk of step losses.

To control the motor current, preferably a controller is used that comprises a first comparator for a lower control threshold H that is set for a low load sum Ls (i.e. a high load angle), as well as a second comparator for an upper control threshold R that is set for a high load sum Ls (i.e. a low load angle).

When the load sum Ls falls below the lower control threshold H (i.e. when the specified high load angle is exceeded) the motor current I preferably is regulated up quickly, i.e. is increased to a maximum current value Imax within one or just a few measuring cycles of the load sum Ls, until the load sum Ls exceeds the lower control threshold H again during a subsequent measuring of the load sum (and the load angle thus decreases accordingly). This allows the motor to react quickly to a load increase and the risk of step losses due to exceeding a load angle of 90° is further reduced.

To ensure that the controller does not become unstable, the motor current I preferably is not regulated down as quickly when the upper control threshold R is exceeded (i.e. when below the specified low load angle), but rather is regulated down in smaller steps, i.e. slower than compared to the quick up-regulation of the current.

Figure 2:
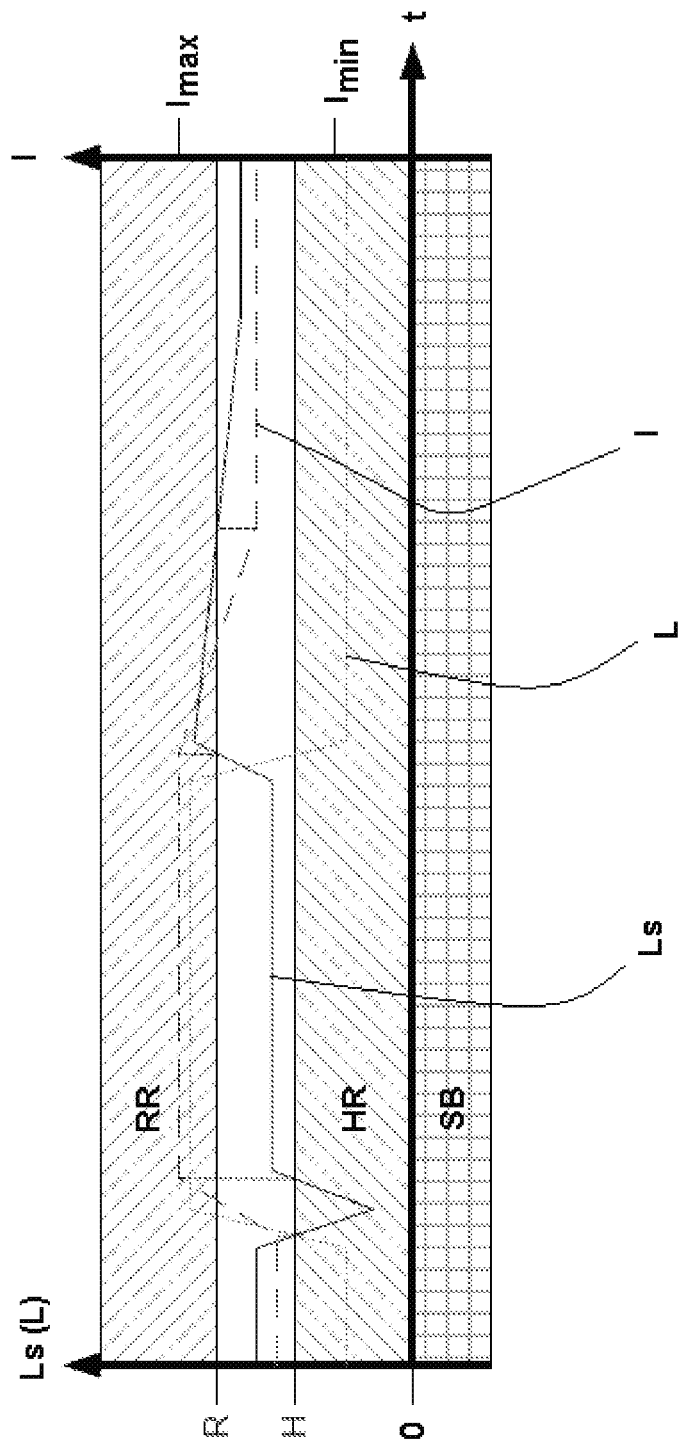
FIG. 2 shows a diagram of the temporal relationships and courses of a load that is applied to a motor, the resulting load sum as well as a motor current controlled by this

These temporal courses of the load sum LS and the amount of the coil current I as well as their influence on this control process are shown in detail in the diagram of FIG. 2, which also includes an assumed course of a motor load L.

On the horizontal axis the time t and on the left vertical axis the load sum Ls is entered in the direction of the arrow and increasing upward, while on the right vertical axis the motor coil current I is entered in the direction of the arrow and increasing upward.

In addition, the lower control threshold H mentioned above as well as the upper control threshold R mentioned above are entered on the left vertical axis for the load sum Ls.

With a load sum Ls of zero, the maximum motor load relative to the currently specified motor current I is applied, which leads to a load angle of essentially 90°. A minimum motor coil current Imin and a maximum motor current Imax are indicated on the right vertical axis.

In addition, three control areas are marked in this diagram: an up-regulate area HR in which the motor current I is increased, as well as a down-regulate area RR in which the motor current I is reduced. Finally a stall area SB of the motor is indicated as well, which is reached when the maximum motor load in relation to the currently specified motor current is exceeded and at which step losses can occur.

The curve L indicates an assumed temporal course of a motor load applied to the motor shaft; in the direction of the arrow upward and increasing. The curve I indicates the temporal course of the amount of the motor current, while the curve Ls shows the temporal course of the load sum that represents the load angle whereby the load angle, as explained above, is determined by the current motor load L and the currently specified motor current I.

So if, for example, the motor load L and thus the load angle increase according to FIG. 2, the load sum Ls decreases according to the above calculations with initially unchanged motor current I. If in the process the load sum Ls falls below the lower control threshold H (and the specified high load angle thus is exceeded), the motor current I is increased relatively quickly as explained above until the load sum Ls exceeds the lower control threshold H again (and the load angle thus falls below the specified high load angle again). With an unchanged increased motor load L the motor current I then remains constant at a high or maximum value Imax until the motor load L decreases again. If in the process the load sum Ls exceeds the upper control threshold R while the high motor current Imax remains unchanged, i.e. the load angle falls below a specified low value, the motor current I is regulated down (slowly, as explained above) until the load sum Ls falls below the upper control threshold R again.

Figure 3:
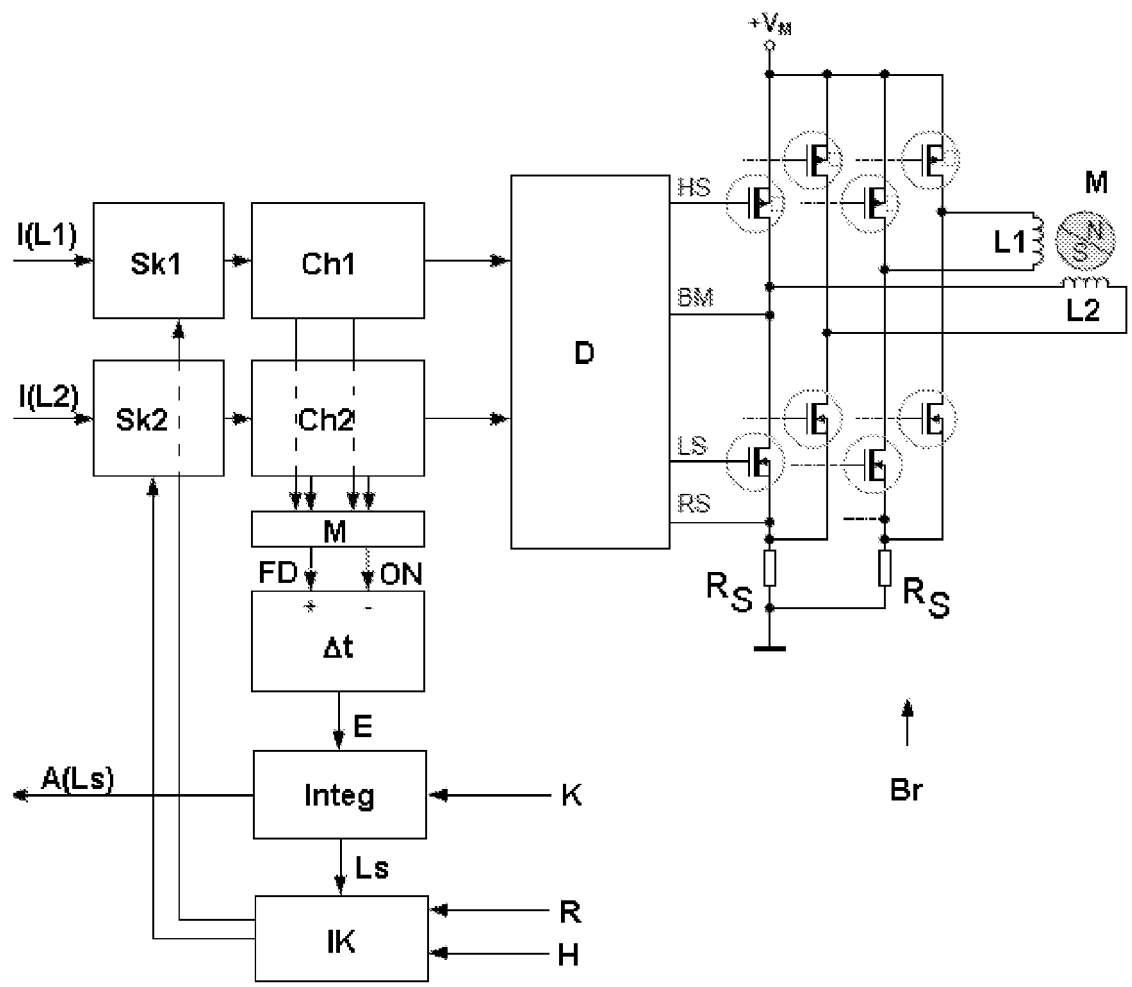
FIG. 3 shows a principle circuit diagram of a stepper motor control unit that includes the components for carrying out the method according to the invention.

FIG. 3 shows an example of a schematic block wiring diagram for carrying out the method in accordance with the invention as part of a circuit arrangement for controlling a stepper motor M. Assumed is again a 2 phase stepper motor with a first and a second motor coil L1, L2, each being energized in a customary manner by means of a power driver bridge circuit Br. A known motor driver unit D is used to control the power driver bridge circuit Br. Since different types of these circuit components are generally known and since their function is described based on FIG. 1, they do not need to be explained further at this point.

The circuit arrangement further comprises a first and, respectively, a second chopper unit Ch1, Ch2 for the first and the second motor coil L1, L2, said chopper units being supplied with a specified current flow I(L1), l(L2) for the first and, respectively, the second coil L1, L2 by means of a first and, respectively, second scaling unit Sk1, Sk2. The specified current flows I(L1), l(L2) for the two motor coils L1, L2 in general have a sine or cosine shape whose amplitudes and frequencies are generated in a customary manner so that the motor M rotates in the desired direction and at the desired speed.

The chopper units Ch1, Ch2 are used to generate the chopper clock signals, which actively push the coil current through the coils L1, L2 during the ON phases as described above, and also to generate the switch signals for the power driver bridge circuit Br for reversing the polarity of coils L1, L2 for the active decrease of the coil currents during the FD phases, as well as for short circuiting the coils L1, L2 during the SD phases according to the above explanations in connection with FIG. 1. Since these chopper units Ch1, Ch2 also are known per se, they do not need to be described in more detail.

The first and, respectively, second scaling unit Sk1, Sk2 that are controlled using the control signals that are generated as described below, are used for setting the coil currents according to the invention.

The two chopper units Ch1, Ch2 are not only connected to the motor driver unit D but also each have two outputs to which the time periods tOn and, respectively, tFD are applied, during which the ON and, respectively, FD phases are activated. These output signals are routed to a multiplexer M to whose two outputs ON and FD the time periods tON and, respectively, tFD are applied alternately for the first and the second coil L1,L2.

The inputs of a device $\Delta t$ for determining the difference are connected to the outputs ON and FD of the multiplexer M, said device being used to determine the difference E between times tON and tFD as described above. This difference E then is routed to an integrator Integ via the output of device $\Delta t$, with the above mentioned offset or correction value K for the ohmic and other losses in coils L1, L2 being applied to said integrator as well. Said integrator Integ then is used, as described above, to calculate the load sum Ls as the product of the supply voltage U and the temporal integral of the current amount that decreases through [the duration of] the phase of (E+K) dt and preferably also to calculate the averaging of a plurality of load sums Ls.

The load sums Ls determined for both motor coils L1, L2 now are routed to an output $\Lambda(Ls)$ of the integrator Integ to display, for example, a corresponding measuring value that represents the load angle or the applied mechanical motor load for the user or to make them available for other measuring processes or evaluations. The motor load that thus is detected in a sensor-free manner thus can be used for other purposes as well independent of the control of the motor current in accordance with the load value.

On the other hand the load sums Ls are routed in succession to a current regulator Ik that also comprises the first comparator for the lower control threshold H and the second comparator for the upper control threshold R. The current regulator Ik thus also comprises two additional inputs for the upper and respectively, lower control threshold R, H, which preferably can be specified by the user or set in another manner. The current regulator Ik generates a scale value for each of the two motor coils L1, L2, said scale value being routed to the first scaling unit Sk1 for the first motor coil L1, and to the second scaling unit Sk2 for the second motor coil L2 and being used to increase or decrease the supplied specified current I(L1), I(L2) for these two coils L1, L2 in relation to the load sum Ls (and thus the load angle) that is determined according to the above explanations, in particular in connection with FIG. 2.

The invention claimed is:

1. A method for sensor-free motor load or load angle detection in a stepper motor that is controlled with ON and FD (fast decay) phases during chopper operation, comprising calculating during a decreasing amount of a current (I(t)) that flows through at least one of the coils of the motor, a load sum (Ls) in the form of the product of the supply voltage of the motor and the temporal integral of (tON*I(t)−tFD*I(t))dt, wherein tON is the temporal duration of the ON phases and tFD is the temporal duration of the FD phases, and wherein the load angle is assumed to be approximately 90° and, respectively, the motor load is assumed to be at a maximum when the load sum (Ls) is at least essentially zero.

2. A method according to claim 1, comprising providing a motor-based offset or correction value (K) for compensating ohmic losses on the internal resistance of the motor coils (L1, L2) with which the integral of (tON*I(t)−tFD*I(t))dt is calculated.

3. A method according to claim 1, comprising carrying out an averaging of a plurality of load sums (Ls) that are determined during a plurality of phases of decreasing amounts of coil current in order to determine a load angle and, respectively, a motor load.

4. A circuit arrangement for sensor-free motor load or load angle detection in a stepper motor with chopper control, in particular for carrying out a method according to claim 1, comprising
a device ($\Delta t$) for determining a difference with which, during a decreasing amount of a current (I(t)) flowing through at least one of the coils of the motor, the difference (E) between the time periods tON of the ON phases and tFD of the FD phases that are defined by the chopper control is determined, and
an integrator (Integ) to which the difference (E) is routed and with which a load sum (Ls) is calculated in the form of the product of the supply voltage of the motor and the temporal integral (E*I(t))dt, whereby the load angle is assumed to be approximately 90° and, respectively, the motor load is assumed to be at a maximum when the load sum (Ls) is at least essentially zero.

5. A circuit arrangement for controlling a motor current in a stepper motor by means of a circuit arrangement according to claim 4, comprising a scaling unit (Sk1, Sk2) being connected upstream in relation to each chopper unit (Ch1, Ch2) for each coil (L1, L2) of the motor (M) for a specified coil current (IL1, IL2), as well as with a current regulator (Ik) for generating a scaling value for each scaling unit (Sk1, Sk2) from a supplied value (E, Ls) that represents the load angle of the motor in a manner that ensures that the load angle is controlled in a range of approximately 90°.

6. A circuit arrangement according to claim 5, in which the current regulator (Ik) comprises a first comparator for a lower control threshold (H) and a second comparator for an upper control threshold (R) as well as inputs for the upper and the lower control threshold (R, H) for controlling the motor current such that the and the motor current (I) is reduced when the load sum (Ls) exceeds the upper control threshold (R).

7. A circuit arrangement according to claim 4, in which a motor-based offset or correction value (K) is applied at the integrator (Integ) for compensating in particular ohmic losses on the internal resistance of the motor coils (L1, L2), whereby the integral of (E*I(t)+K)dt is calculated.

8. A method according to claim 1, wherein the coil current I(t) in the terms (tON*I(t) and tFD*I(t) is assumed to be substantially equal.

9. A method for controlling a motor current in a stepper motor in which a load angle or a motor load of the motor is determined in accordance with a method which comprises calculating during a decreasing amount of a current (I(t)) that flows through at least one of the coils of the motor, a load sum (Ls) in the form of the product of the supply voltage of the motor and the temporal integral of (tON*I(t)−tFD*I(t))dt, whereby tON is the temporal duration of the ON phases and tFD is the temporal duration of the FD phases, and whereby the load angle is assumed to be approximately 90° and, respectively, the motor load is assumed to be at a maximum when the load sum (Ls) is at least essentially zero, wherein the motor current is controlled in dependence on the motor load so that the load angle is approximately 90°.

10. A method according to claim 9, wherein the motor current (I) is increased faster with increasing motor load than it is decreased with decreasing motor load.

11. A method according to 9, wherein a lower control threshold (H) is specified at which the motor current (I) is increased when the load sum (Ls) falls below the lower control threshold (H), and an upper control threshold (R) is specified at which the motor current (I) is reduced when the load sum (Ls) exceeds the upper control threshold (R).

* * * * *